United States Patent Office 3,835,047
Patented Sept. 10, 1974

---

3,835,047
METHOD FOR TREATING SOLUTIONS CONTAINING CYANOHYDRINS
Pierre Colin, Saint-Avold, France, assignor to Produits Chimiques Ugine Kuhlman, Paris, France
No Drawing. Filed Feb. 10, 1972, Ser. No. 225,290
Claims priority, application France, Feb. 11, 1971, 7104553
Int. Cl. C02b 1/38
U.S. Cl. 210—63                9 Claims

ABSTRACT OF THE DISCLOSURE

The instant invention relates to a method for treating aqueous solutions containing cyanohydrins for the purpose of rendering the solutions non-toxic, which comprises reacting the cyanohydrins contained in solution with hydrogen peroxide to form biodegradable oxamide.

The instant invention also relates to a method for treating solutions containing at least a metallic salt of hydrocyanic acid, hereinafter referred as cyanide, for the purpose of rendering said solutions non-toxic, which comprises reacting the cyanides contained in the solutions with carbonyl compounds to convert the cyanides to the corresponding cyanohydrins, reacting said cyanohydrins in solution with hydrogen peroxide to form biodegradable oxamide.

BACKGROUND OF THE INVENTION

(I) Field of the Invention

This invention relates to a method for treating cyanohydrins and cyanides contained in aqueous solutions for the purpose of rendering the solutions non-toxic.

(II) Description of the Prior Art

It is well known that cyanohydrins are by themselves toxic to a degree comparable to the toxicity of the cyanides which can result from the decomposition of the cyanohydrins. Some known methods of decomposing cyanohydrins only substitute one toxic product for the toxic product initially present and do not by themselves resolve the problem of treating waste solutions containing cyanohydrins with the purpose of completely eliminating their toxic character.

It has been proposed to decompose cyanohydrins to cyanides and then oxidize cyanides with various oxidants, for example hydrogen peroxide, to form cyanates which can then be hydrolyzed to form carbon dioxide gas and ammonia. However, such oxidation consumes at least one mole of oxidant per mole of cyanide, a practical disadvantage. Moreover the reaction is slow and thus requires the use of a catalyst. The most effective catalyst appears to be a copper catalyst which possesses the drawbacks of being toxic and adding to the cost.

SUMMARY OF THE INVENTION

The instant invention relates to a method for treating aqueous solutions containing cyanohydrins for the purpose of rendering the solutions non-toxic, which comprises reacting the cyanohydrins contained in solution with hydrogen peroxide to form biodegradable oxamide.

The instant invention also relates to a method for treating solutions containing cyanides for the purpose of rendering said solutions non-toxic, which comprises reacting the cyanides contained in the solutions with a carbonyl compound to convert the cyanides to the corresponding cyanohydrins, reacting said cyanohydrins in solution with hydrogen peroxide to form biodegradable oxamide.

It has been discovered that the cyanohydrins can be practically completely transformed into oxamide by means of hydrogen peroxide. The overall reaction can be written as follows:

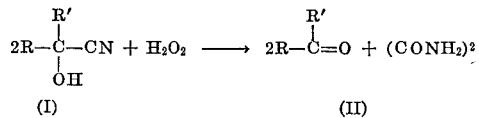

wherein R and R' each can represent a hydrogen atom or a hydrocarbon radical. It will be noted that this method of oxidation requires only one mole of hydrogen peroxide for every two cyanide radicals present in the cyanohydrin molecule and does not require a catalyst.

It has also been discovered that cyanides, including for example hydrogen cyanide, can also be transformed into an oxamide by first reacting the cyanide with a carbonyl compound of the general formula

wherein R and R' each have the same meaning designated above, and reacting the resulting cyano derivative with hydrogen peroxide according to the above equation.

DESCRIPTION OF THE PREFERRED EMBODIMENTS

Each of the radicals in the cyanohydrin compounds (I) and carbonyl compounds (II) can be hydrogen, or a straight or branched chain alkyl radical having up to eight carbon atoms.

Examples of alkyl radical include methyl, ethyl, propyl, isopropyl, butyl, isobutyl, pentyl, isopentyl, hexyl, isohexyl, heptyl, isoheptyl, octyl and isooctyl.

The process is advantageously carried at a temperature below about 100° C.

The pH will be maintained in the range from about 8 to 12 and advantageously between about 9 and 10.

The hydrogen peroxide can be added in the form of an aqueous solution as commercially supplied. The pH can be maintained at the desired level generally by the addition of known alkaline agents, the commercial solutions of hydrogen peroxide usually being acidic.

A higher rate of reaction is favored by an increase in temperature.

If the method of this invention is used for treating waste process water obtained from the manufacture of cyanohydrins, acrylic monomers or acrylic resins, the quantity of hydrogen peroxide employed should also take into account the other oxidizable impurities contained in the waste.

The method of this invention can be applied to the purification of water containing hydrogen cyanide by reacting the cyanide with a formula (II) carbonyl compound to form a cyanohydrin under conditions well known in the art.

The method of this invention has the advantage of being highly effective. When applied to a solution of cyanohydrins, the result is their practically complete elimination.

The concentration of CN⁻ groups in the following examples was determined by the Epstein method upon 1-phenyl-3-methyl-5-pyrazolone at a pH between 4 and 9 after the excess peroxide was eliminated. This method is known to detect up to about 0.01 mg./liter of CN⁻ ions.

Example 1

An aqueous solution containing 0.068 gram molecular weight/liter of acetaldehyde cyanohydrin or lactonitrile

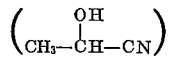

had been reacted at 21° C. at a pH maintained at 10 with hydrogen peroxide with a molar ratio H₂O₂/cyanohydrin of 0.5.

After 7 hours of reacting, there remained less than 0.01 mg./liter of the cyanohydrin of acetaldehyde expressed as CN⁻ and the entire amount of hydrogen peroxide had been consumed.

Example 2

An aqueous solution containing 0.734 gram molecular weight per liter of acetaldehyde cyanohydrin was reacted at 23° C. at a pH maintained at 11 with hydrogen peroxide with a molar ratio $H_2O_2$/cyanohydrin of 0.75.

After 5 hours of reacting, there remained less than 0.01 mg./liter of acetaldehyde cyanohydrin expressed as CN⁻ and 0.0075 moles $H_2O_2$ or a consumption of 0.646 moles $H_2O_2$ per mole of cyanohydrin.

Example 3

The same solution as in Example 2 was reacted under the same conditions of concentration and reagents, however, at a temperature of 40° C.

After two hours of reacting, there remained 0.01 mg./liter of acetaldehyde cyanohydrin expressed as CN⁻ and 0.0125 mole $H_2O_2$ or a consumption of 0.579 moles of $H_2O_2$ per mole of cyanohydrin.

Example 4

An aqueous solution containing 0.072 gram molecular weight per liter of acetaldehyde cyanohydrin was reacted at 25° C. at a pH maintained at 11 with hydrogen peroxide with a molar ratio of $H_2O_2$/cyanohydrin of 1.

After reacting for one hour, there remained 0.01 mg./liter acetaldehyde cyanohydrin expressed as CN⁻ and 0.028 moles $H_2O_2$ or a consumption of 0.613 moles $H_2O_2$ per mole of cyanohydrin.

Example 5

The same solution as in Example 4 was reacted at 25° C. with the pH maintained at 11 with hydrogen peroxide except with a molar ratio $H_2O_2$/cyanohydrin of 2.

After 20 minutes of reacting, there remains less than 0.01 mg./liters of acetaldehyde cyanohydrin expressed as CN⁻ and 0.1 moles $H_2O_2$ or a consumption of 0.61 moles $H_2O_2$ per mole of cyanohydrin.

Example 6

An aqueous solution containing 0.07 gram molecular weight per liter of formaldehyde cyanohydrin or glycolonitrile

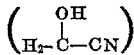

was reacted at 25° C. at a constant pH of 12, with hydrogen peroxide at a molar ratio of $H_2O_2$/cyanohydrin of 2.

After one hour of reacting there remained 0.01 mg./liter of cyanohydrin expressed as CN⁻ and 0.088 mole $H_2O_2$ or a consumption of 0.74 moles $H_2O_2$ per mole of cyanohydrin.

Example 7

The same solution as in Example 6 was reacted under the same conditions of concentration and reagents, however, at a temperature of 45° C.

After reacting for ten minutes, there remained less than 0.01 mg./liter of the cyanohydrin expressed as CN⁻ and 0.026 moles $H_2O_2$ or a consumption of 1.63 moles $H_2O_2$ per mole of cyanohydrin.

Example 8

An aqueous solution containing 0.07 gram molecular weight per liter of acetone cyanohydrin

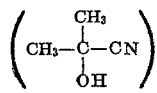

was reacted at 40° C. at a constant pH of 10 with hydrogen peroxide at a molar ratio $H_2O_2$/cyanohydrin of 2.

After reacting for forty-five minutes, there remained less than 0.01 mg./liter of cyanohydrin expressed as CN⁻ and 0.055 moles $H_2O_2$ or a consumption of 1.23 moles $H_2O_2$ per mole of cyanohydrin.

Example 9

An aqueous solution containing 0.072 gram molecular weight per liter of acrolein cyanohydrin

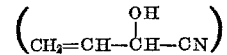

was reacted at 25° C. at a constant pH of 11 with hydrogen peroxide at a molar ratio of $H_2O_2$/cyanohydrin of 2.

After reacting for forty-five minutes there remained less than 0.01 mg./liter of cyanohydrin expressed as CN⁻ and 0.055 moles $H_2O_2$ or a consumption of 1.23 moles of cyanohydrin.

Example 10

The same solution as in Example 9 was reacted under the same conditions of concentration and reagents, however, at a temperature of 45° C.

After reacting for fifteen minutes, there remained less than 0.01 mg./liter of acrolein cyanohydrin expressed as CN⁻ and 0.02 moles $H_2O_2$ or a consumption of 1.722 moles of hydrogen peroxide per mole of cyanohydrin.

I claim:

1. A method for treating aqueous solutions containing cyanohydrins for the purpose of rendering said solutions non-toxic, which method consists essentially of reacting the cyanohydrins contained in solution with hydrogen peroxide at a pH between 8 and 12 to form oxamide in accordance with the following reaction:

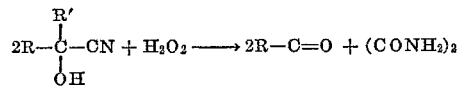

2. The method of claim 1 wherein the cyanohydrins are reacted at temperatures below about 100° C. and the pH is maintained between 9 and 10.

3. The method of claim 1 wherein the solution of cyanohydrins contains other oxidizable impurities and the amount of hydrogen peroxide employed is determined by taking into account the quantity of said impurities present.

4. The method of claim 1 wherein the cyanohydrin is formaldehyde cyanohydrin, acetaldehyde cyanohydrin, acetone cyanohydrin or acrolein cyanohydrin.

5. A method for reating solutions containing cyanides for the purpose of rendering said solutions non-toxic, which method consists essentially of reacting the cyanide contained in solution with a carbonyl compound to convert the cyanides to cyanohydrin, reacting the cyanohydrin contained in solution with hydrogen peroxide at a pH between 8 and 12 to from oxamide in accordance with the following reaction:

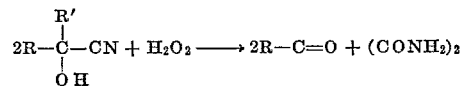

6. The method of claim 6 wherein the carbonyl compound is formaldehyde, acetaldehyde, acetone or acrolein.

7. A method for treating waste waters containing cyanohydrins for the purpose of rendering said waste waters non-toxic, which method consists essentially of reacting the cyanohydrins contained in said waste waters with hydrogen peroxide at a pH between 8 and 12 to form oxamide in accordance with the following reaction:

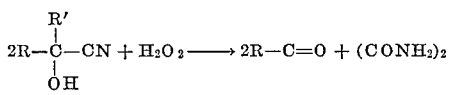

8. A method for treating waste waters containing cyanides for the purpose of rendering said waste waters non-toxic, which method consists essentially of reacting the cyanide contained in said waste waters with a carbonyl compound to convert the cyanides to cyanohydrin, reacting the cyanohydrin contained in said waste waters with hydrogen peroxide at a pH between 8 and 12 to form oxamide in accordance with the following reaction:

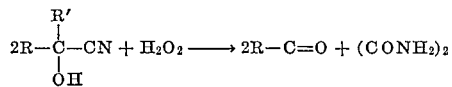

9. The method of claim 8 wherein the carbonyl compound is formaldehyde, acetaldehyde, actone or acrolein.

References Cited
UNITED STATES PATENTS

| | | | |
|---|---|---|---|
| 3,617,582 | 11/1971 | Lawes et al. | 210—63 |
| 3,715,309 | 2/1973 | Zumbrunn | 210—63 |

FOREIGN PATENTS

| | | | |
|---|---|---|---|
| 1,150,096 | 4/1969 | England | 210—59 |

OTHER REFERENCES

*The Chemistry of Organic Cyanogen Compounds*, Vartkes Migrdichian, Reinhold, N.Y. 1947, p. 100.

U.S. Cl. X.R.

SAMIH N. ZAHARNA, Primary Examiner

B. CASTEL, Assistant Examiner

UNITED STATES PATENT OFFICE
CERTIFICATE OF CORRECTION

Patent No. 3,835,047                    Dated September 10, 1974

Inventor(s) Pierre Colin

It is certified that error appears in the above-identified patent and that said Letters Patent are hereby corrected as shown below:

Column 2, line 65 "0.068" should read -- 0.05883 --.

Column 4, line 54 "reating" should read --treating--.

Column 4, line 61 "from" should read --form--.

Column 4, line 68 "6" should read --5--.

Column 6, line 2 "actone" should read --acetone--.

Signed and sealed this 11th day of February 1975.

(SEAL)
Attest:

RUTH C. MASON
Attesting Officer

C. MARSHALL DANN
Commissioner of Patents
and Trademarks